United States Patent [19]

Hagedorn et al.

[11] 4,215,754
[45] Aug. 5, 1980

[54] LOAD MEASURING SYSTEM FOR LEAF SPRING SUSPENSIONS

[75] Inventors: Thomas H. Hagedorn, Seattle; Allen L. DeForrest, Auburn, both of Wash.

[73] Assignee: Structural Instrumentation, Inc., Tukwila, Wash.

[21] Appl. No.: 962,207

[22] Filed: Nov. 20, 1978

[51] Int. Cl.$^2$ .................... G01G 19/08; G01G 3/14
[52] U.S. Cl. .................................... 177/137; 177/211
[58] Field of Search .................. 177/136, 137, 211

[56] References Cited

U.S. PATENT DOCUMENTS

| | | | |
|---|---|---|---|
| 2,813,709 | 11/1957 | Brier | 177/137 |
| 3,241,626 | 3/1966 | Woodburn | 177/137 |
| 3,724,571 | 4/1973 | Thorn et al. | 177/137 X |
| 3,743,041 | 7/1973 | Videon | 177/211 X |
| 3,794,130 | 2/1974 | Malgren et al. | 177/137 |
| 3,934,663 | 1/1976 | Johansson | 177/137 |
| 3,935,915 | 2/1976 | Seilly et al. | 177/211 X |
| 4,020,911 | 5/1977 | English et al. | 177/136 |

*Primary Examiner*—George H. Miller, Jr.
*Attorney, Agent, or Firm*—Seed, Berry, Vernon & Baynham

[57] ABSTRACT

A system for measuring the load carried by a vehicle of the type employing a leaf spring suspension. In a leaf spring suspension an elongated spring is supported between a pair of spaced apart hangers on each side of the vehicle. The hangers are then secured to the vehicle frame. An axle extends transversely beneath the vehicle and is clamped to the center of the springs. The measuring system includes four spaced apart strain gauges mounted on the upper surface of the spring beneath the axle clamp equidistant from the center of the spring. The strain gauges are connected to each other in a bridge configuration, and they measure the strain of the springs responsive to vehicle loading.

10 Claims, 4 Drawing Figures

LOAD MEASURING SYSTEM FOR LEAF SPRING SUSPENSIONS

BACKGROUND OF THE INVENTION

1. Field of the Invention

This invention relates to weighing systems and, more particularly, to an on-board system for measuring the weight of a vehicle.

2. Description of the Prior Art

Strain gauges have been used to measure load induced deflection of various components of vehicle suspensions. For example, U.S. Pat. No. 4,042,049 describes a vehicle weighing system in which respective strain measuring transducers are mounted on a pair of equalizing beams positioned on opposite sides of the vehicle. The beams are pivotably secured to the vehicle frame at their centers, and they have tandem axles secured to their ends. The strain transducer measures the load induced deflection of the equalizing beams thereby providing an indication of vehicle weight.

Because of the widespread usage of leaf spring suspensions, it is extremely advantageous to devise a system capable of measuring load induced strain of leaf springs employed in this type of suspension. One skilled in the art initially looking at the problem would undoubtedly conclude that the optimum location for measuring strains would be between the clamp and one of the hangers since this is the area of greatest response to loading and it is free of interference from the leaf spring mounting structure. Mounting the strain measuring device beneath the axle clamp would not be considered desirable since it is generally felt that spring strain beneath the clamp is relatively insignificant. The strain distribution within the clamped region is not well understood and common spring design employs empirical relations to determine the effective active length of the spring. Also, it is thought that expansion of the axle clamp structure, generally a pair of U-bolts, as well as creep in a low friction liner positioned between the clamp and spring would cause the preload of the spring to vary thereby producing erroneous readings.

Contrary to conventional wisdom that the mid-point between the axle clamp and one of the hangers is the optimum location for measuring spring strain, it has been determined that this location is far from ideal. The basic problem is that the lower surface of the hangers which contact the upper surface of the springs are curved so that the distance from the axle clamp to the point of contact between the hangers and the springs varies as the vehicle load varies. This characteristic prevents the strain in the vehicle spring from being a linear function of vehicle load so that the output of a strain measuring device mounted on the spring between the axle clamp and one of the hangers would not be directly proportional to vehicle load. Also, most of the settling that takes place over the life of the spring occurs between the end and middle of the spring. This causes offsets that cannot be compensated for by strain gauges. Thus, it has not heretofore been possible to accurately measure the load carried by a vehicle employing a leaf spring suspension by utilizing on-board weighing systems.

SUMMARY OF THE INVENTION

The principal object of the invention is to provide a system for measuring the load carried by a vehicle having a leaf spring suspension.

It is another object of the invention to provide an on-board load measuring system which does not require extensive retrofit of the vehicle suspension.

It is still another object of the invention to provide an on-board load measuring system for a vehicle which is rugged yet provides highly accurate indications of the vehicle load.

This and other objects of the invention are accomplished by measuring the load induced strain occurring in the springs beneath a clamp which fastens the springs to a structural member by mounting transducer means on the springs beneath the clamp. The transducer means are preferably strain gauges bonded directly to the springs. In order to minimize temperature effects on the system, two or more strain gauges should be employed in a bridge circuit and they should be placed in a manner which allows them to respond identically to temperature induced strains.

DETAILED DESCRIPTION OF THE INVENTION

Figure 1:
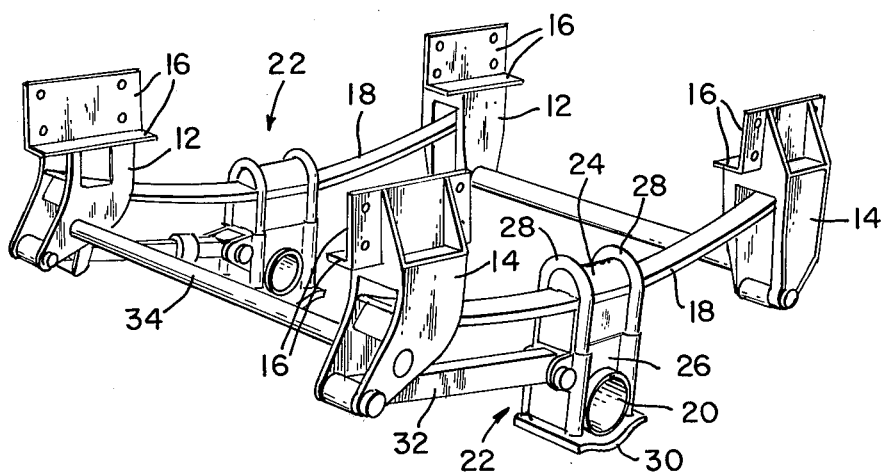
FIG. 1 is an isometric view of a vehicle suspension of the type employing the inventive load measuring system.

A typical leaf spring suspension system commonly employed on trucks or trailers is illustrated in FIG. 1. The system includes a first pair of hangers 12 positioned on one side of the vehicle (not shown) and a second pair of hangers 14 positioned on the opposite side of the vehicle. The hangers 12, 14 each include a pair of mounting flanges 16 abutting each other at right angles which are secured to the frame of the vehicle. A leaf spring of the "mono-leaf" variety 18 extends between respective pairs of hangers 12, 14. An axle 20 is clamped to the center of the leaf springs 18 by respective axle clamps 22. The axle clamps 22 include an upper spacer member 24 having a rectangular cross-section, a rounded upper surface and a generally flat lower surface contacting the upper surface of the springs 18. The spacer members 24 are secured to respective axle seats 26 by conventional U-bolts 28 straddling the spacer 24 and spring 18 and extending downwardly through a fastening plate 30 where bolts (not shown) are secured to their ends. A torque arm 32 extends from the lower end of one hanger in each pair of hangers 12, 14 to the axle clamp 22 to align the axle with respect to the vehicle and prevent excessive rearward and forward movement of the axle. Cylindrical cross tubes 34 are connected between corresponding hangers 12, 14 on opposite sides of the vehicle.

Figure 2:
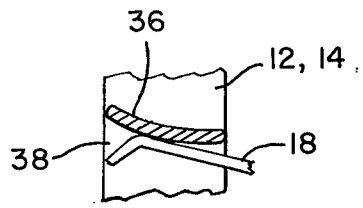
FIG. 2 is a cross-sectional detail view showing the leaf spring mounting structure which causes the effective length of the leaf springs to vary responsive to vehicle loading.

As best illustrated in FIG. 2, the hangers 12, 14 have formed therein a curved support plate 36 against which the end 38 of the springs 18 bear. The curvature of the support plate 36 causes the effective point of contact between the support plate 36 and spring 18 to vary as the load carried by the vehicle varies. Consequently, the effective length of the spring 18 varies responsive to vehicle loading. For example, heavier loads shorten the active length of the spring 18 while lighter loads increase the active length of the spring. Thus, the strain occurring in the springs 18 intermediate the hangers 12, 14 and the axle clamps 22 is a non-linear function of vehicle loading. However, it has not heretofore been recognized that the strain occurring in the spring 18 within the boundaries of the axle clamps 22 is substantially a linear function of vehicle loading.

One of the most commonly used leaf spring suspension systems is illustrated in FIGS. 1 and 2. It will be understood, however, that the inventive load measuring system also finds applications with other varieties of leaf spring suspensions employing a clamp for fastening the spring to a structural member. Specifically, by way of non-limiting example, the centers of equalizing beams of equalizing beam suspensions sold by Hendrickson Mfg. Co. of Lyons, Illinois are connected to the frame of a vehicle through leaf springs. The centers of the leaf springs are clamped to the beams by saddles similar to those illustrated herein and the ends are connected to the vehicle frame by hangers having the characteristics illustrated in FIG. 2.

Figure 3:
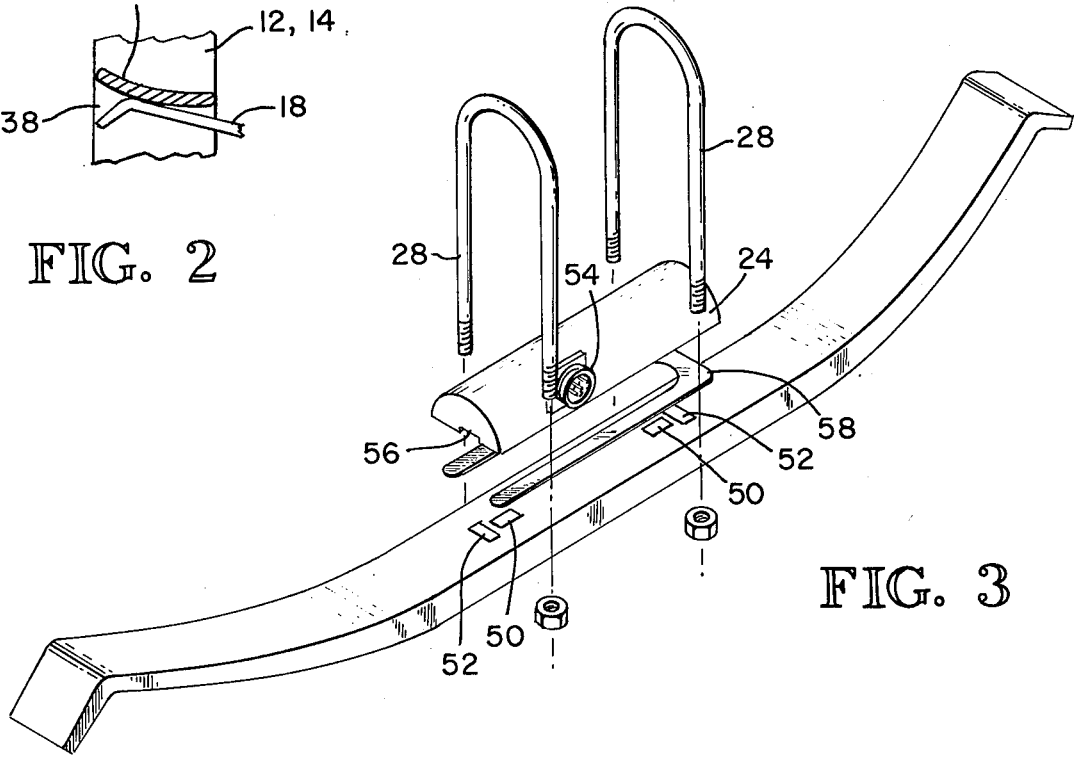
FIG. 3 is an exploded isometric view showing the measuring system installed in the vehicle suspension of FIG. 1.

The inventive load measuring system is installed on the vehicle suspension of FIG. 1 in the manner illustrated in FIG. 3. The system includes a first pair of strain gauges 50 and a second pair of strain gauges 52 bonded to the leaf spring 18 at locations equally spaced apart from the center of the spring 18. The first pair of strain gauges 50 have an axis of sensitivity extending along the length of the spring 18 while the second pair of strain gauges 52 have an axis of sensitivity extending transversely of the spring 18. As the load carried by the vehicle increases, the center of the spring 18 moves upwardly with respect to its ends causing the upper surface of the spring 18 to elongate as measured by the first pair of strain gauges 50 and also causing the upper surface of the spring 18 to narrow as measured by the second pair of strain gauges 52. Although strain gauges are illustrated herein for measuring spring strain occurring within the boundaries of the axle clamp 22, it will be understood that other strain sensing means may be employed without departing from the invention.

Although the clamping force of the axle clamps 22 on the spring 18 does affect the response of the strain gauges 50, 52 to vehicle loading, tests indicate this force changes only slightly during an initial break-in period and does not cause a significant effect. This finding is contrary to conventional wisdom that the clamping force would make reliable measurements beneath the clamp impractical. Also, a plot of load versus strain for any spring will reveal a hysteresis loop. The gauge locations were selected to insure that the up load portion of this loop would be linear.

In order to allow the strain gauges 50, 52 to be connected to an indicating device, an electrical connector 54 of conventional variety is mounted in the spacer 24. The spacer 24 is also modified by forming a recess 56 in its flat lower surface to provide clearance for the strain gauges 50, 52 between the spring 18 and spacer 24. A liner 58 formed by a material having a low coefficient of friction such as DELRIN is sandwiched between the spacer 56 and spring 18 to facilitate free deformation of the spring 18 beneath the spacer 24.

Figure 4:
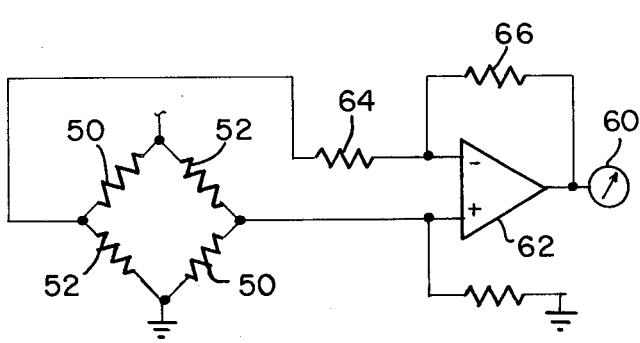
FIG. 4 is a schematic illustrating the manner in which the strain gauges are connected to external circuitry for providing an indication of vehicle load.

The strain gauges 50, 52 are connected to an indicating means such as a meter 60 as illustrated in FIG. 4. The strain gauges 50, 52 are interconnected in a bridge arrangement so that as the resistance of strain gauges 50 increases and the resistance of strain gauges 52 decreases, the input to the non-inverting terminal of operational amplifier 62 increases while the input to the inverting terminal of amplifier 62 through resistor 64 decreases thereby producing an output from amplifier 62 indicative of the load carried by the vehicle. The gain of the amplifier 62 is proportional to the ratio of the resistance 66 to the sum of resistance 64 and the source resistance of the strain gauges 50, 52.

Temperature induced strains of the springs 18 cause the resistance of all of the strain gauges 50, 52 to increase in unison so that the differential input to the amplifier 62 remains at zero.

By employing the heretofore unknown concept of measuring load induced strain beneath the spacers 24, the inventive load measuring system is thus able to produce an accurate indication of vehicle load over a wide range with a minimum of modifications to conventional leaf spring suspension systems.

We claim:

1. A system for measuring the load carried by a vehicle having a pair of leaf springs positioned on opposite sides of said vehicle with each leaf spring having a structural member secured to its mid-point by respective clamps and their ends supporting said vehicle through respective support structures, said system comprising transducer means mounted on said springs beneath said clamps for measuring the load induced strain of said springs beneath said clamps, and indicator means receiving the output of said transducer means for providing an indication of the load carried by said vehicle.

2. The system of claim 1 wherein said transducer means comprise a pair of strain gauges bonded to a common face of each leaf spring at locations within the periphery of said clamp equidistant from the mid-point of said spring.

3. The system of claim 1 wherein said transducer means comprise a first pair of strain gauges bonded to a common face of each leaf spring responding to longitudinal strains in said spring, and a second pair of strain gauges bonded to a common face of each leaf spring responding to lateral strains in said spring, said strain gauges being positioned within the periphery of said axle clamp equidistant from the mid-point of said spring.

4. The system of claim 1 wherein said structural member is an axle.

5. The system of claim 1 wherein said transducer means comprise a strain gauge bonded to each of said leaf springs within the periphery of said clamp.

6. The system of claim 5 wherein said clamp includes a spacer having a rectangular outline, a rounded upper surface and a generally flat lower surface contacting the upper surface of said spring, said spacer and spring being secured to said structural member by a pair of U-bolts, the lower surface of said spacer having formed therein a recess for providing clearance for said strain gauge between said spring and spacer.

7. A system for measuring the load carried by a vehicle having a pair of leaf springs positioned on opposite sides of said vehicle with each leaf spring having an axle secured to its mid-point by respective axle clamps and their ends supporting said vehicle through respective hangers, said system comprising a strain gauge bonded to each of said leaf springs within the periphery of said axle clamp for measuring the load induced strain of said springs beneath said clamps, and indicator means receiving the output of said transducer means for providing an indication of the load carried by said vehicle.

8. The system of claim 7 wherein said axle clamp includes a spacer having a rectangular outline, a rounded upper surface and a generally flat lower surface contacting the upper surface of said spring, said spacer and spring being secured to said axle by a pair of U-bolts, the lower surface of said spacer having formed therein a recess for providing clearance for said strain gauge between said spring and spacer.

9. A method of measuring the load carried by a vehicle having a pair of leaf springs positioned on opposite sides of said vehicle with each leaf spring having a structural member secured to its mid-point by respective clamps and their ends supporting said vehicle through respective support structure, said method comprising measuring the load induced strain occurring in said springs beneath said clamps.

10. The method of claim 9 wherein said strain is measured by a strain gauges bonded directly to said spring within the periphery of said axle clamp.

* * * * *